UNITED STATES PATENT OFFICE.

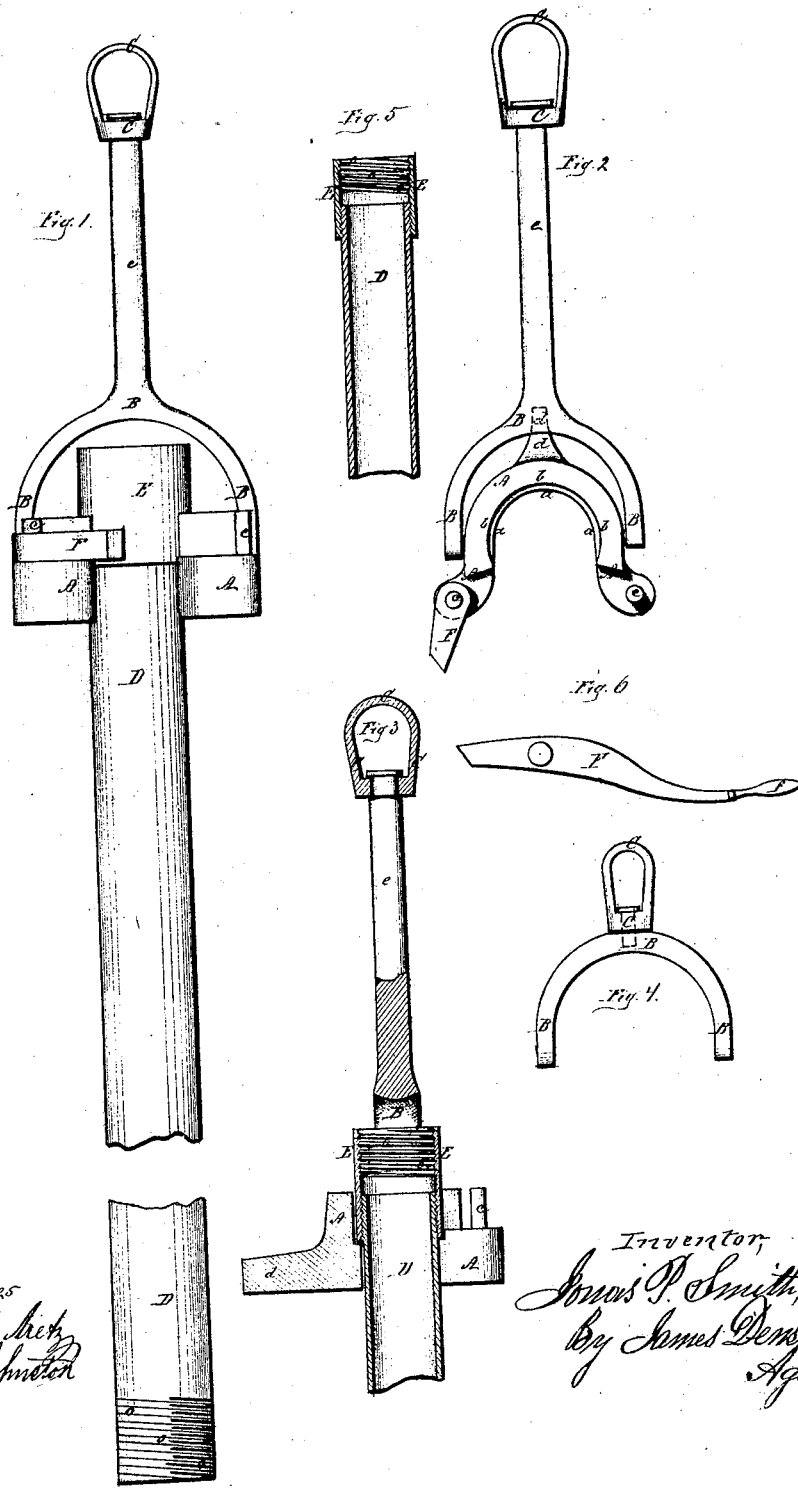

JONAS P. SMITH, OF PIONEER, PENNSYLVANIA.

IMPROVEMENT IN TUBE-DRAWERS FOR DEEP WELLS.

Specification forming part of Letters Patent No. 109,462, dated November 22, 1870.

*To all whom it may concern:*

Be it known that I, JONAS P. SMITH, of Pioneer, Venango county, Pennsylvania, have invented an Improved Tube-Drawer for Petroleum and other Wells, which is an improvement on my tube-drawer an application for a patent for which is now pending.

As explained in my application for a patent for a tube-drawer, filed July 27, 1869, in almost all petroleum-wells, in some salt-wells, and in some other like wells it is the custom to insert what is called "tubing" to reach below all veins of what is called "surface" or fresh water. This tubing is a series of tubes or pipes, ten to fifteen or twenty feet long each. On the peripheries of these tubes or pipes, at each end of each for a space of about two inches, a screw is cut. These tubes are coupled together by what are called "thimbles," a thimble being a short tube or pipe about four to six nches long, and large enough to go over the tubes to be coupled together, with screws cut at each end on the inside on the circumference of the circle or hole to fit and screw onto the screws on the peripheries of the tubes to be connected. The tubing comes from the manufactory with a thimble fitted and screwed onto each tube, so that practically each thimble is an integral part of the tube it is screwed onto at the manufactory, it being screwed on there so firmly and tightly as not to come off in practical use afterward; and all there is to do to couple the tubes together is to screw one into another, and in doing this one tube must be held firmly while another is turned and screwed in. To hold one tube firmly while another is screwed into it an instrument heretofore in common use is what is called a "clamp-tongs" or "tubing-tongs"—a pair of tongs pivoted together and adapted to reach around a piece of tubing, and grip it so as to hold it rigidly; and the object of this invention is to improve my tube-drawer, and to combine in one instrument both a "tube-drawer" and tubing-tongs; and the nature of the invention is in combining a swivel with the bail, and combining a reversible gripping-tongs with the seat or rest of my tube-drawer.

The following description and accompanying drawings, both having like letters of reference, fully illustrate the invention.

A is a socket or seat or rest stout enough to hold a desired amount of tubing, and open at one side or end horizontally, something in the shape of a horseshoe.

*a* is a hole or circle through the socket A vertically in the end, corresponding to what may be called the "toe" of a horseshoe, which, and the horizontal opening at the other end are large enough and not larger than to receive tubing easily when put in sidewise or horizontally.

*b* is a hole or recess or circular rabbet part way through the socket A vertically, and directly over the hole *a*, large enough to receive a thimble from above.

*c* is a pivot-pin in the end of each arm of the socket A, at the end corresponding to what may be called the "heel" of a horseshoe, and, for convenience, the ends of the socket-arms may be rabbeted down to the plane of the rabbet *b*.

*d* is a horn or stop on the end of the socket A opposite the open end of the pivot-pin *c*.

B is a socket-bail pivoted to the sides of the socket A across the hole and rabbet *a* and *b*, in line directly through the middle horizontally of the tubing when the tubing is in place within the socket, and large enough to swing over the top of the thimble E when swung upright, and, when the thimble is in place, screwed onto a tube, D, and resting on the rabbet *b* within the socket A, and small enough to fit over and hold the thimble securely within the socket.

*e* is a shank or handle, which may be an integral part of the bail B, as in Figs. 1, 2, and 3; or the bail may be made without it, as in Fig. 4.

C is a swivel, attached to the outer or upper end of the handle *e* of the bail B, as in Figs. 1, 2, and 3, or attached directly to the bail, as in Fig. 1.

D is a tube or pipe or piece of tubing, an inside sectional view of which is seen in Figs. 3 and 5, and a full outside view in Fig. 1.

E is a thimble, screwed onto an end of a tube, D, an inside sectional view of which is seen in Figs. 3 and 5, and an outside view in Fig. 1.

*o* is a screw on the inside of each end of each thimble E, as in Figs. 3 and 5, and on the outside of each end of each tube D, as in Figs. 1, 3, and 5.

F is a reversible tong with a "duck's bill" chisel-face, pivoted to the socket A on one of the pins $c$, as in Figs. 1 and 2, and may be changed from one to the other of the pins at will. For convenience, the tong F may be made with a handle, $f$, somewhat as in Fig. 6, if desired.

These are the parts of the instrument, which, when combined, make a convenient tool for drawing tubing out of a well, for letting it down into a well, and for holding one part rigidly while another piece is screwed in.

To work the invention, swing the bail B over out of the way onto the stop $d$ of the socket A. Then put a tube, D, with a thimble, E, screwed onto the upper end of the tube, through between the pins $c$, into the hole $a$ within the socket. Then, if desired to draw up or let down the tubing, swing the bail upright over the thimble and attach a rope or chain to the swivel C, and raise or lower with a windlass or otherwise, as desired; or if desired to hold the thimble rigidly while another tube is screwed into the upper end, put the tong F onto one of the pins $c$, according as the screw is right or left, and hold the chisel-edge against the thimble.

The following are my claims:

1. The combination of a swivel with the hinged bail of a tube-drawer, substantially as described.

2. The combination of a recessed socket with a tong hinged to such socket, of a tube-drawer, substantially as described.

JONAS P. SMITH.

Witnesses:
JOSEPH W. JONES,
F. I. THOMPSON.